United States Patent [19]

Golinsky

[11] 4,179,697

[45] Dec. 18, 1979

[54] PASSIVE RANGING METHOD

[75] Inventor: Martin Golinsky, East Hills, N.Y.

[73] Assignee: Grumman Aerospace Corporation, Bethpage, N.Y.

[21] Appl. No.: 873,005

[22] Filed: Jan. 27, 1978

[51] Int. Cl.² ............................................. G01S 5/02
[52] U.S. Cl. ................................. 343/112 D; 235/412; 343/112 C; 364/460
[58] Field of Search ........... 343/112 R, 112 D, 112 C; 364/458, 460; 235/412

[56] References Cited

U.S. PATENT DOCUMENTS

| 2,921,306 | 1/1957 | Jaffe | 343/112 R |
| 3,304,409 | 2/1967 | Snowdon et al. | 364/458 X |
| 3,378,842 | 4/1968 | Phillips | 343/112 R |
| 3,710,331 | 1/1973 | Kiisk | 343/112 D |

Primary Examiner—Maynard R. Wilbur
Assistant Examiner—Richard E. Berger
Attorney, Agent, or Firm—Bruce B. Brunda; Richard G. Geib

[57] ABSTRACT

The present invention relates to a target location method, and more particularly to such a system using passive listening devices to determine the range, course and speed of one or more targets simultaneously. The invention may be used effectively against targets which emit either continuous or pulsed electromagnetic energy signals.

9 Claims, 4 Drawing Figures

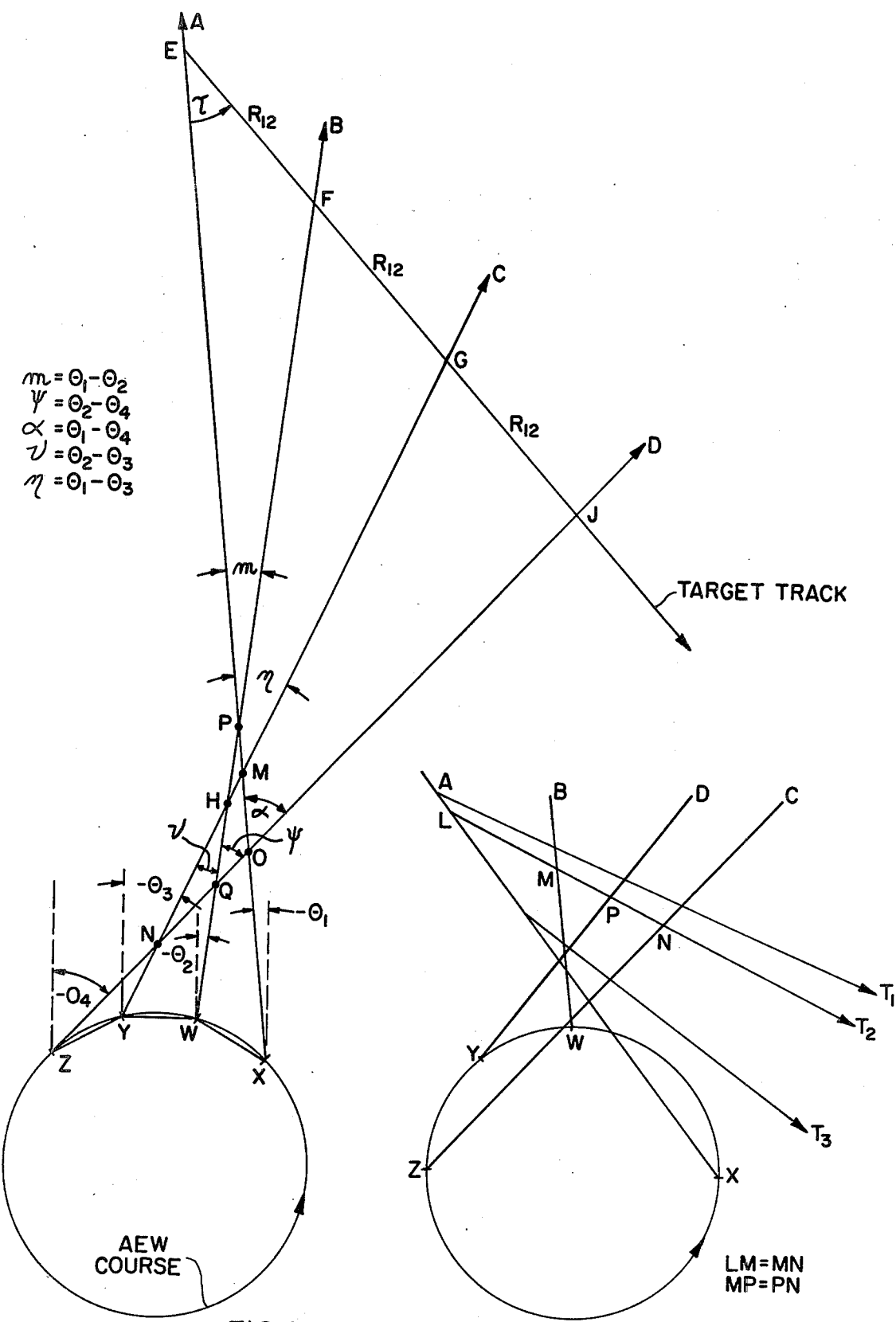

PASSIVE RANGING METHOD

BACKGROUND OF THE INVENTION

The measurement of the position of a moving target is frequently performed by an airborne radar. The elapsed time between the transmission of a burst of energy and its reception after reflection from a target is a measure of the distance. However, the transmission of the energy by the radar reveals its presence to a potential enemy who may be "listening" for these transmissions. It is thus advantageous to develop a technique for determining the position of a moving target passively; that is, by receiving energy without first transmitting it.

Previous methods of passive target location typically involve vectoring and referencing a sensor, or by referencing a plurality of omnidirectional sensors and comparing their respective signals. The target to be detected may be either a stationary emitter or a moving vehicle.

Many passive detection systems have been proposed in the prior art, as for example that shown in U.S. Pat. No. 2,940,076, issued June 7, 1960, to T. B. Bisset et al, and U.S. Pat. No. 3,304,409, issued Feb. 14, 1967, to C. Snowdon and R. A. Bond. One such technique is a variation of one that has been used by sailors from antiquity to avoid collision. Basically, the observing, or test craft detects energy waves and modifies its own course until the measured bearing to the target does not change with time. At this point the test craft undergoes a further maneuver and the range may then be calculated. This technique may be ineffective against targets moving at a velocity greater than the velocity of the observer since a zero bearing rate is not always possible. Further limitations develop when the target is a noncontinuous emitter and when the system is required to locate more than one target at a time.

Other prior art systems, such as that disclosed in U.S. Pat. No. 3,982,246, issued Sept. 21, 1976, to B. H. Luber, require "continuous" angular measurements which in practice may not be obtainable when the test craft is undergoing dynamic maneuvers or when the target is a non-continuous emitter. Furthermore, such a system requires integrators, differentiators, gyros, accelerometers, and resolvers, all of which introduce their own errors into the system. For use against more than one target, the system would necessitate duplication of much of the bulky analog equipment. The present invention avoids these restrictions.

Additional prior art techniques involve the use of a variety of optical, electromagnetic, or acoustic sensors, as well as the use of cooperating ground-based receiving and transmitting stations. Many such techniques also require a plurality of cooperating sensor units and additional cross-correlator equipment.

The present invention utilizes a novel technique for determining the position of a target for use when the target is radiating energy signals of its own, or reflecting signals which have been generated elsewhere. This technique is effective against either continuous or pulsed energy emitting systems, and it requires only one, rather than cooperating, test platform. Four bearings, taken at discrete and arbitrary times, together with the known course traveled by the test aircraft between the measurements are necessary and sufficient for calculating the target's distance from the test platform. The course traveled by the test aircraft is easily determined from a navigation system such as is typically included in any military aircraft.

One mission for which this technique is intended is airborne early warning (AEW). In this mission, the target may be hundreds of miles from the AEW aircraft. This scenario offers certain advantages and makes certain necessary assumptions realistic. One such assumption is that the target aircraft is not maneuvering. Aircraft generally avoid maneuvers during most of their flight to conserve fuel, and undergo maneuvers only near their targets.

A second assumption inherent in the explanation which follows is that the AEW and target aircrafts are in the same horizontal plane. This assumption is valid because the large distances separating the horizontally moving AEW and target aircrafts result in small vertical angles between them for reasonable altitude separations.

SUMMARY OF THE INVENTION

Accordingly, it is a major object of the present invention to permit complete target position determination of a continuous or noncontinuous emitter using only measured angular information relating to the direction of arrival of the energy signal supplied by the sensor's passive detection system at discrete intervals of time.

It is another object of this invention to provide a technique for positioning a multitude of targets which is as effective against targets moving faster than the observing craft as it is against slowly moving (including stationary) targets.

It is a further object of this invention to provide a passive ranging system which normally requires no constraints on the movement of the sensing apparatus relative to the target, thereby permitting the observation craft to travel its normal trajectory.

It is a further object of this invention to provide a novel and effective passive detection system which requires a minimum of complexity and a minimum of additional equipment aboard the test craft.

These and other objects are accomplished within the present invention by the use of a sensor which detects energy signals emitted by the target. The invention will be more fully understood by reading the description with joint reference to the attached drawings.

BRIEF DESCRIPTION OF THE DRAWINGS

FIG. 3 is a geometric diagram which illustrates the relationship between the target and the test craft at the point of detection.

FIG. 4 is a geometric diagram which illustrates the procedures used to determine the position of the target craft.

DETAILED DESCRIPTION OF THE DRAWINGS

Figure 1:
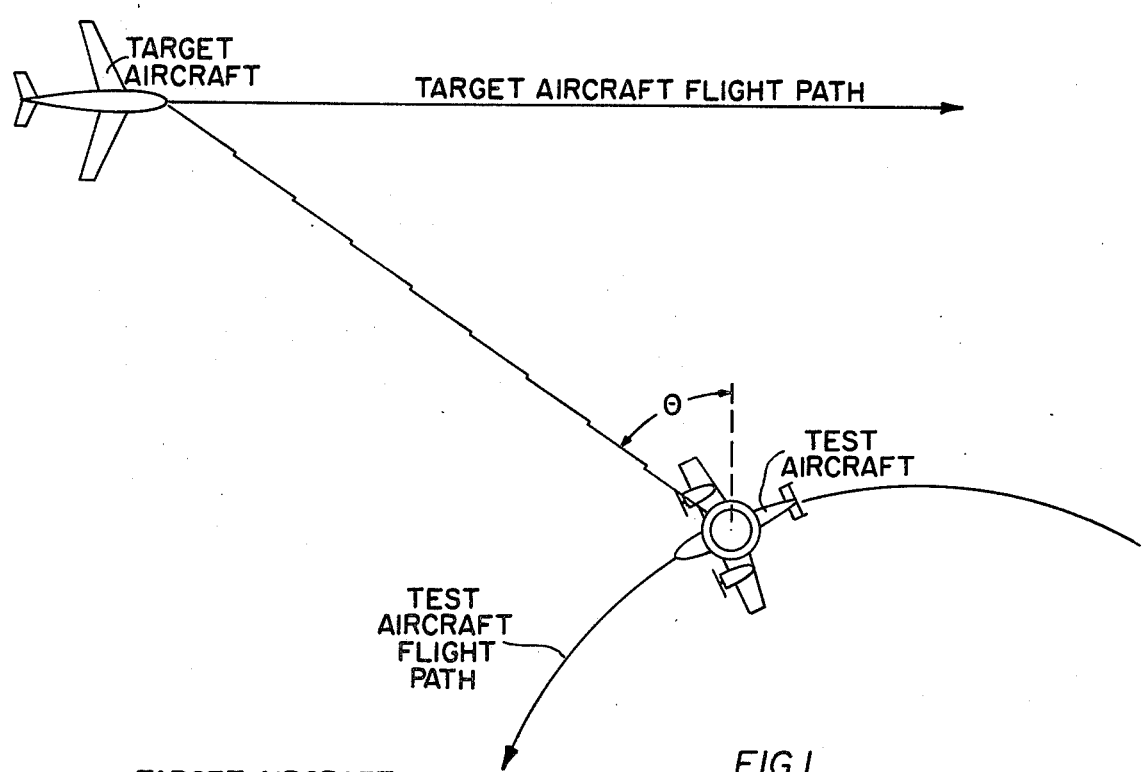
FIG. 1 is an illustration of a test aircraft receiving an energy signal emitted by a target aircraft.

FIG. 1 illustrates a typical scenario involving a test craft, such as an AEW aircraft, receiving an energy signal being transmitted by a target aircraft. The test aircraft is shown traversing a trajectory arbitrarily chosen to be circular.

Figure 2:
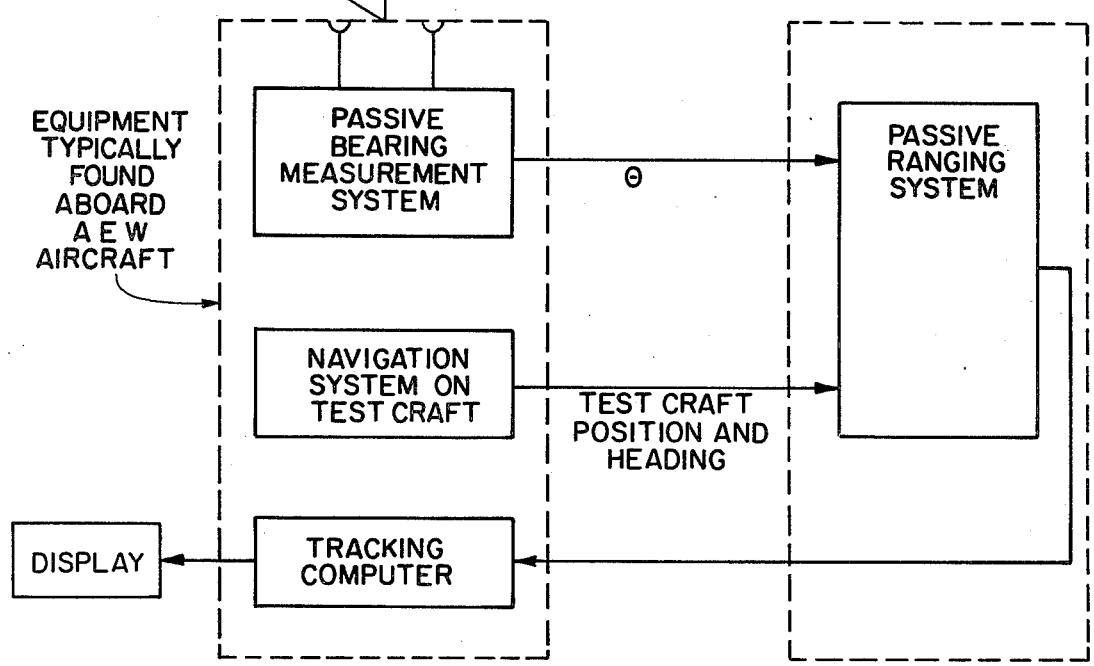
FIG. 2 is a block diagram representation of a passive ranging system as suggested by this application.

FIG. 2 illustrates apparatus which could be used in implementing the present invention and indicates how this apparatus is to be inter-connected.

When a target aircraft transmits an energy signal, such as a radar pulse, the test aircraft receives the signal through its antenna and into its Passive Bearing Measurement System. This system measures the bearing to the target as well as other emitter characteristics. Systems of this type are commercially available from manufacturers such as Litton Industries, Amecom Division. The Litton model, Number ALR-59, is an example of such a passive detection system.

The test aircraft's own position, velocity, and flight path are determined by its own navigation system. One skilled in the art would recognize that navigational systems such as this are commercially available. One system which could perform this function is manufactured by Litton Industries, being designated as Model ASN-92.

Once the target bearing and the test craft's position are simultaneously known, the passive ranging system of this invention enables target ranging after four measurements have been made. The method by which this ranging is determined is explained more fully in the description accompanying FIGS. 3 and 4.

After the bearing and range of the target have been determined, this information may be transferred to a tracking computer which has the ability to store information on several targets and use this information to enhance the missions of the AEW aircraft. Tracking computers are also available commercially and can be exemplified by units such as Litton Industries' Model L-304, which is also capable of performing the functions required of the passive ranging system.

It should be noted that the present invention makes use of systems already aboard many test aircraft and therefore offers distinct advantages over systems which require additional bulky and expensive equipment.

FIG. 3 illustrates the fundamental concept of this invention. It is a plan view showing an AEW aircraft moving in a circular horizontal orbit. The assumption of a circular orbit is for convenience only. It is also assumed, only for convenience in explaining the concept, that the AEW aircraft is traveling at a constant speed. Four bearing measurements are made when the AEW is at points X, W, Y, and Z, respectively. These bearing measurements can be made by well-known techniques such as the use of a Passive Bearing Measurement Radar System. The points of detection may be any four points in the AEW's orbit but, for illustrative purposes, it is assumed here that point W is one-fourth lap after the first point X, Y is the three-eighths, and Z is the one-half lap point. In general these four points may lie on any open curve that is not a straight line.

To see that a unique solution exists to determining the emitter's position after the fourth measurement, consider the bearing lines XA, WB, and ZC. Because of the assumption of a non-maneuvering target and a constant speed AEW, and because the time intervals between the AEW measurements at X, W, and Z are equal, the distance traveled by the target between bearing line WB and ZC is equal to that traveled between XA and WB. FIG. 3 shows three possible target trajectories that satisfy this requirement. They are labeled $T_1$, $T_2$, and $T_3$. Consider now, the AEW at point Y, which is half way between points W and Z. At this point in time, the target must be half way between lines WB and ZC. Of all the possible trajectories ($T_1$, $T_2$, $T_3$, etc.) only one will be intersected by the measured bearing line YD at a point half way between lines WB and ZC. In FIG. 3, this is indicated by the line segments MP and PN being equal, so that of all the possible trajectories, $T_2$ is the true trajectory. This geometric proof has been converted into an analytical derivation of the position of the target. The equations so derived are explicit and require no trial and error. A derivation of the target's position follows.

The derivation of the unknown range is aided by referring to FIG. 4. This figure is a more detailed version of FIG. 3, and defines the known (measured) and unknown (calculated) quantities. Although a specific geometrical relationship between the AEW and target is implied by the figure, the derived equations hold for any relative orientation.

In FIG. 4, the following quantities are known either because they have been measured (as for the bearing angles to the emitter) or calculated by the AEW navigation system (as for the distances and headings of the AEW). All angles are measured positive in a counter-clockwise direction from North:

$\theta_1$, $\theta_2$, $\theta_3$, $\theta_4$ are the bearing angles to the target when the AEW is at position X, W, Y, Z respectively and the target is at E, F, G, J respectively.

WX, WY, WZ are the straight line distances traveled by the AEW between the first and second, second and third, and second and fourth measurements respectively.

Angles PXW, QZW, AND HYW are known because each one is the difference between a known bearing angle and a known AEW course direction.

The following angles are also known because each one is the difference between two measured bearing angles. Differences, rather than sums, are appropriate because of the assumed angular sign convention.

| | |
|---|---|
| $m = \theta_1 - \theta_2$ | $v = \theta_2 - \theta_3$ |
| $\psi = \theta_2 - \theta_4$ | $\eta = \theta_1 - \theta_3$ |
| $\alpha = \theta_1 - \theta_4$ | |

Consider triangle EFP ($\Delta$EFP), wherein $R_{12}$ is the distance traveled by the target in going from point E to point F, and $R_{12}$ is the distance traveled between sample points. $\tau$ is the angle between the target course vector and the first bearing line which must be determined.

In triangle PWX ($\Delta$PWX), distance WX is known, as are angles m and PWX. Therefore $\Delta$PWX is completely determined and PW is known. Similarly QW is known from $\Delta$QZW because ZW and angles $\psi$ and QZW are known. It is then a simple subtraction process to determine PQ.

Analogously, side HW of $\Delta$HWY can be determined, making it a simple subtraction process to determine HQ.

By means of equations derived from these trigonometric relationships and straightforward substitution well known to one skilled in the art, the value of $R_{12}$ are $\tau$ are determined.

For example, in the geometry illustrated here, $$\tan\tau = \frac{2 \sin m \sin\alpha \sin v [1 - PQ/HQ] + PQ/HQ \sin m \sin\psi \sin\eta]}{2 \sin m \sin v \sin\alpha [PQ/HQ - 1] + \sin\psi [\sin v - PQ/H (\sin m \cos\eta]} \quad (1)$$

$$R_{12} = \frac{PQ}{\frac{2\sin(\tau + \alpha)}{\sin\psi} - \frac{\sin\tau}{\sin m}} \qquad (2)$$

Since $R_{12}$ and $\tau$ are known, the remaining unknown distances can easily be determined. For example, in $\Delta EFP$, $$EP = R_{12} \sin[(\tau+m)]/\sin m \qquad (3)$$

Furthermore, because $\Delta PWX$ is completely determined, PX is known, which permit a simple determination of EX.

As EX is the distance from the AEW to the target at the first sample point, its determination solves the problem. However to improve accuracy in the presence of measurement errors, the distances at the second, third, and fourth measurements may also be calculated at this point. Furthermore, measurements 2, 3 and 4 may be used with a fifth measurement to update the range calculation. This updating may be continued for as long as desired.

These relationships can also operate in essentially real time on different sets of four measurements, where each set is determined by the passive detection system to have resulted from a distance emitter. Therefore, the number of emitters that may be positioned by the technique is limited only by the number of allocated track files in the storage device. Once the target range and/or course have been determined, this information can be displayed by use of techniques well known to those skilled in the art.

It is to be understood that a great number of variations may be made in the invention without departing from its spirit and scope. For example, the received energy signal may be in any part of the electromagnetic spectrum, including optical frequencies. If the angle of arrival of the visible signal from a star is measured by an earth based telescope and if this measurement is repeated over a period of time as the earth traverses its orbit around the sun, then the method described herein may be used, with suitable modifications, to calculate the distance to the star.

Having described the method of the present invention it is now desired to set forth the intended projection sought by these Letters Patent in the appended claims that follow.

What is claimed is:

1. A method of passively determining the range of a target from a test platform comprising:
    traversing a course in a test platform along a path at least one portion of which is not on a straight line;
    detecting at a test platform the presence of an energy signal from a target at least four discrete times;
    generating a detection signal responsive to the angle of arrival of each of said energy signals;
    generating a positioning signal derived from the position of the test platform at the time of said energy signal reception;
    storing said detection signal and said positioning signals in a storage device;
    energizing an apparatus for determining the course and range of the target from said stored signals;
    generating a target indication signal representative of the range and course of the target as determined; and,
    using said indication signal to activate a display representative of the target.

2. The method as recited in claim 1 wherein the step of detecting comprises receiving continuously generated energy signals.

3. The method as recited in claim 1 wherein the step of detecting comprises receiving pulsed energy signals.

4. The method as recited in claim 1 wherein the step of detecting comprises receiving a continuously generated radar signal.

5. The method as recited in claim 1 wherein the step of detecting comprises receiving pulsed radar signals.

6. The method as recited in claim 1 wherein the step of detecting comprises receiving a continuously generated optical frequency signal.

7. The method as recited in claim 1 wherein the step of detecting comprises receiving pulsed optical frequency signals.

8. The method as recited in claim 1 wherein the step of traversing a path comprises traversing a circular path.

9. A method of passively determining the range of an airborne target from a test aircraft comprising:
    traversing a circular path in the test aircraft;
    detecting the presence of a radio energy signal by the test aircraft at least four discrete times;
    generating a detection signal responsive to the angle of arrival of each of said radio energy signals;
    generating a positioning signal derived from the test vehicle's position at the time of reception of each of said radio energy signals;
    storing said detection signals and said positioning signals in a storage device;
    energizing an apparatus for determining the course and range of the target from said stored signals;
    generating an electrical target indication signal representative of the range and course of the target as determined, and
    using said indication signal to activate a display representative of the target.

* * * * *